United States Patent [19]

Spisak et al.

[11] Patent Number: 4,660,688

[45] Date of Patent: Apr. 28, 1987

[54] ADAPTIVE RIDE HYDRAULIC DAMPER WITH PISTON ROD DRESS CAP

[75] Inventors: Andrew M. Spisak, Youngstown; Robert L. Adduci, Girard, both of Ohio

[73] Assignee: General Motors Corporation, Detroit, Mich.

[21] Appl. No.: 685,460

[22] Filed: Dec. 24, 1984

[51] Int. Cl.⁴ .............................................. F16F 9/46
[52] U.S. Cl. .............................. 188/299; 188/322.11; 188/319; 174/81
[58] Field of Search .................... 188/299, 319, 322.11; 248/56; 174/81, 82, 153 G; 339/103 R, 103 B, 103 C, 103 M

[56] References Cited

U.S. PATENT DOCUMENTS

| | | | |
|---|---|---|---|
| 1,294,155 | 2/1919 | Phelps | 174/81 |
| 1,378,195 | 5/1921 | Phelps | 174/81 |
| 1,381,073 | 6/1921 | Johnson | 174/81 |
| 2,573,600 | 10/1951 | Pruehs | 248/56 |
| 3,231,300 | 1/1966 | Moroney | 174/153 G |
| 3,420,341 | 1/1969 | Keehn | 188/319 |
| 3,827,538 | 8/1974 | Morgan | 188/319 |
| 4,089,496 | 5/1978 | Mizusawa | 174/153 G |
| 4,185,509 | 1/1980 | Nishikawa et al. | 188/319 |
| 4,527,676 | 7/1985 | Emura et al. | 188/299 |

Primary Examiner—John W. Caldwell, Sr.
Assistant Examiner—Alvin Oberley
Attorney, Agent, or Firm—Charles R. White

[57] ABSTRACT

Adaptive ride air suspension strut with internal actuator within hollow piston rod which is operatively connected to a computer control system through electrical bulkhead and high pressure seal which is connected to by cables leading upwardly therefrom through a special wire routing and sealing type dress cap fitted to the hollow end of the strut to guide and direct the cables to a plug connected to the control system.

3 Claims, 6 Drawing Figures

ADAPTIVE RIDE HYDRAULIC DAMPER WITH PISTON ROD DRESS CAP

This invention relates to hydraulic dampers and more particularly to an adaptive ride hydraulic suspension strut or shock absorber unit having a low profile cable dress cap to position and maintain terminals, connectors and fluid seals within a hollow piston rod while providing effective routing and protection of electrical cables leading to an electric actuator within the rod.

Prior to the present invention, various type hydraulic shock absorber and strut units have had operator controlled variable damping capability to provide the vehicle operator with a selective ride to suit road conditions or meet operator requirements. While such suspension units have provided ride control, they generally require bulky external electrical or mechanical actuators, control systems and cable routings which do not meet standards for compactness and high precision control.

The present invention is utilized in conjunction with a hydraulic suspension strut or shock absorber with an electrically energizeable motor or actuator internal of a hollow piston rod activated to precisely control and vary flow control orificing of the piston which strokes in an oil-filled cylinder tube to damp suspension spring action. An insulated bulkhead and fluid seal connects internally to the acctuator and extends upwardly to a connector socket having cables that extend through an upper seal seated on the upper end of the piston rod. A cable dress cap to which this invention is particularly drawn is installed on the end of the piston rod to ensure the internal electrical connections are made. The dress cap further provides a low profile while protecting and guiding the cables of the wire harness leading from a control system.

In the preferred embodiment, the dress cap of this invention is a one-piece molded plastic unit with interior and exterior connections to the top end of the piston rod so that it is positively locked thereon when properly installed. When locked in place, the dress cap positions and maintains the location of the electrical terminals, insulator bulkhead and seal inside of the piston rod. If improperly installed, the dress cap self-rejects from the open end of the piston rod. Furthermore, the dress cap maintains its profile below the top of the strut when fully mated and provides protection for the cable so that no damage will occur during installation. The dress cap further provides improved wire dress for a damper and protects and secures the cables after assembly to withstand forces from a wide range of vibration and shock occurring during vehicle operation. The dress cap is preferably preassembled as part of a wire harness for ease of handling and to prevent loss of parts. Precise assembly and removal of the dress cap with respect to the piston rod is readily accomplished usually without tools even in relatively inaccessible locations. The dress cap has long service life in harsh engine compartment environment and protects the hollow piston rod from intrusion of moisture or foreign matter.

One feature, object and advantage of this invention is to provide a new and improved low profile cable dress cap for installation on the outer end of a hollow piston rod of a suspension damper which guides and protects electrical cables leading into an internal electric motor with the damper while providing a sealing plug with positive locking features for releasable connection to the upper end of the rod.

Another feature, object and advantage of the present invention is to provide improved control of the variable damping characteristics of the valving of a hydraulic damper of a strut or shock absorber and further to new and improved cable dress cap for positively and releasably mounted to a hollow piston rod for the electrical cables leading into an internal electrically energizeable motor mechanism in the damper so that the outer configuration of the strut or shock is not materially changed.

Another feature, object and advantage of the present invention is to provide a new and improved cable dress cap and for an electrically energizeable actuator mounted internally in a hollow piston rod in a variable rate damper.

These and other features, objects and advantages of this invention will be more apparent from the following description and drawing in which.

Figure 1:
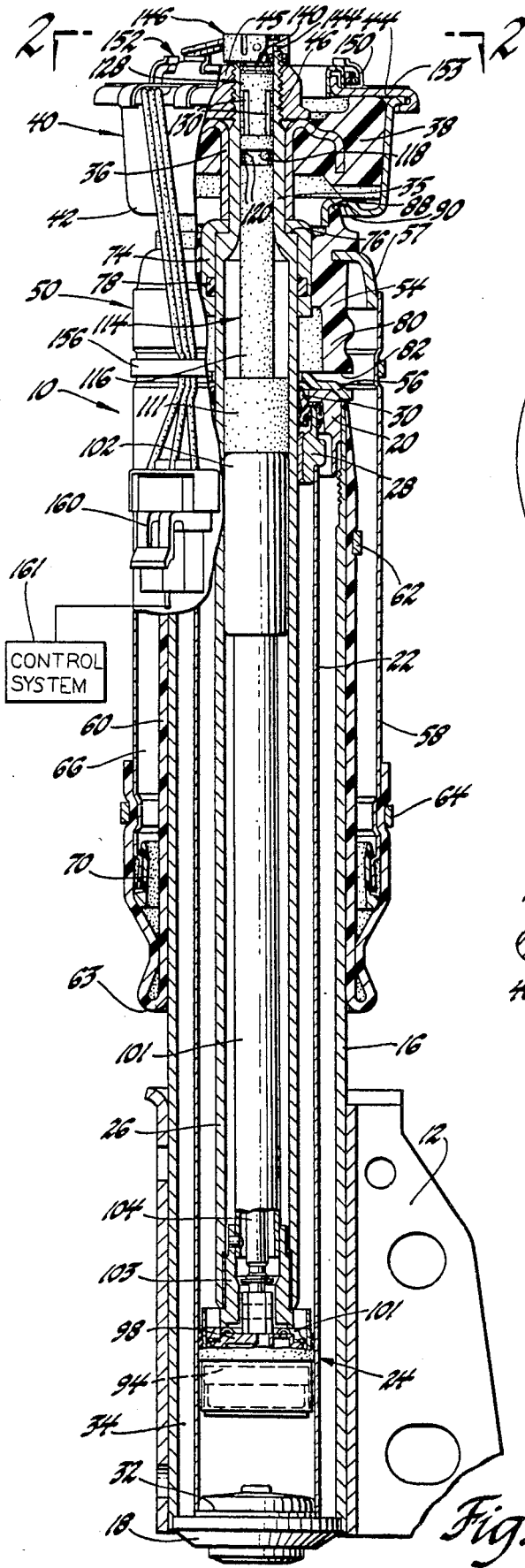
FIG. 1 is a side elevational view with parts in cross-section of a suspension strut illustrating a preferred embodiment of this invention.

Turning now in greater detail to the drawing, there is shown in FIG. 1 a suspension strut 10 having a bracket 12 at its lower end adapted to be secured to a vehicle road wheel assembly, not illustrated. More particularly, the strut comprises a hydraulic damper with an elongated outer reservoir tube 16 closed by a lower end cap 18 and secured within the pocket provided by the bracket 12. The reservoir tube 16 extends upwardly from the bracket to a terminal end cap or seal cover 20 welded to the upper end of the reservoir tube. The strut contains an elongated oil-filled cylinder tube 22 spaced inwardly from and concentric with the reservoir tube 16 in which a piston assembly 24 with adjustable valving is mounted for stroking movements. A hollow piston rod 26 attached at its inner end to the piston assembly 24 extends upwardly therefrom through a rod guide 28 mounted on the upper end of the cylinder tube 22 and held in position by the end cap 20.

An annular elastomer seal 30 is mounted in the rod guide 28 and has annular sealing contact with the piston rod 24 to prevent loss of hydraulic shock absorber oil from the unit as the piston strokes in the cylinder tube during damping operations. A base valve 32 secured to the lower end of the cylinder tube controls the flow of shock absorber oil between the cylinder tube and a fluid reservoir 34 formed between the cylinder tube and the reservoir tube on compression and rebound stroke of the piston for damping action of the suspension spring provided by this unit. The hollow piston rod 26 has a reduced diameter upper end 35 which carries a metallic connector 36 with an upper flange that is embedded in a torroidal elastomeric isolator cushion 38 of an upper mount assembly 40. This cushion 38 has a low spring rate to dissipate vibratory energy from entering into the vehicle from the piston assembly 24 as it reciprocates in the cylinder tube to damp suspension spring action. A metallic shell or housing 42 and cover plate 44 partially encloses the isolator cushion 38 as shown in FIG. 1. Nut 45 is threaded onto the reduced diameter and correspondingly threaded upper end 46 of the hollow piston rod to secure the upper mount assembly to the piston rod. Threaded fasteners, not shown, conventionally secure the upper mount assembly to the sheet metal of a mounting tower or other support formed in the body of the vehicle.

A compliant cover plate assembly 50 including a cylindrical jounce bumper 54 of a suitable elastomer material is secured to an upper end of the hollow piston rod 26 immediately below the upper mount assembly 40. In jounce, this bumper is contacted and deflected by a bumper plate 56 welded to the top of the end cap 20 of the hydraulic damper. The compliant cover plate assembly also includes a cup-shaped connector plate 57 of sheet metal having an inner diameter embedded in the jounce bumper and the outer diameter welded to the upper end of the cylindrical steel dust tube 58. The dust tube extends from upper attachment with the plate 57 down and around the reservoir tube in conventional manner.

Strut 10 has an air suspension spring provided by a cylindrical elastomer air sleeve 60 having its inner end and upper end connected to the upper end of the reservoir tube 16 by a constricted clamping ring 62. From this clamping ring the sleeve 60 follows downwardly around the outer periphery of the reservoir tube and is reversely curved intermediate the ends thereof to form a rolling lobe 63. From this lobe, the sleeve extends upwardly and around the lower end of the dust tube 58. A second clamping ring 64 similar to clamping ring 62 is employed to secure the sleeve to the lower end of the dust tube in an airtight manner. The pneumatic chamber 66 formed by the dust tube, the reservoir tube, the elastomer air sleeve and compliant cover plate assembly is charged with pressurized air or other gas to provide a pneumatic suspension spring for vehicle suspension purposes. One system for controlling the pressure within the air spring may be based on the system disclosed in U.S. Pat. No. 3,372,919 to G. W. Jackson assigned to the assignee of this invention and hereby incorporated by reference.

There is improved operation of the pneumatic suspension spring and extended service life of the elastomer sleeve 60 with the addition of air sleeve guide 70 which is releasably attached to the lower end of the dust tube 58. This guide is a resilient wide torrus or ring of plastic material which has a smooth exterior surface and low friction engagement with the elastomeric air sleeve 60 to reduce sleeve wear during operation of the strut. The ring-like guide is formed with a centralized external groove which fits into the outwardly flanged lower end of the dust tube as shown in FIG. 1.

The jounce bumper 54 of this invention is bonded at its internal diameter to a generally cylindrical insert or jounce bumper stop 74 of steel which fits over the shoulder 76 provided by the reduced diameter upper end portion of the hollow piston rod 26. This insert or stop contacts the lower end of connector 36 and has an inner annular groove therein which receives the elastomeric O-ring 78 that forms a static seal which sealingly engages the piston rod 26 to prevent air leakage past the jounce bumper. Jounce bumper 54 has a downwardly extending skirt 80 with convolutions that terminate in a lower annular end surface 82. On jounce, the bumper skirt 80 is deflected as the contact plate 56 engages surface 82 and moves toward the jounce bumper stop 74. Jounce movement is further retarded by the engagement of the end of stop 74 with plate 56. In addition to providing a jounce function, the cover plate assembly 50 provides the compliant upper end and seal for the air spring provided by the pressurized pneumatic chamber 66. The collar-like upper end 88 of the jounce bumper assembly 54 has an end surface that seats against the lower surface 90 of the metallic shell 42 of the upper mount assembly 40.

With the preferred construction, the piston rod is connected to the isolator cushion 38 so that hydraulic forces generated by the piston as it strokes in the cylinder tube of the strut will be primarily routed to and dissipated by the isolator cushion 38 which preferably has a lower spring rate than that of jounce bumper 54. This substantially reduces the transmittal of road shocks by the piston rod to the passenger compartment of the vehicle to materially contribute to the comfort of the operator and passengers therein. The suspension spring loads from the air sleeve will be carried through the higher spring rate jounce bumper 54 to the shell-like housing 42 of the upper mount assembly.

The piston assembly 24 provides selective damping rates and preferably has variable deflected disk valving with flow control orifices therein whose flow size openings can be varied to control the damping characteristics of the strut. This variable orifice construction is preferably like that of copending application Ser. No. 646,843, abandoned, for Hydraulic Damper For Variable Deflected Disk Piston Valving, filed Sept. 4, 1984 assigned to the assignee of this invention and hereby incorporated by reference. Generally this valving comprises an orifice plate 94 fixed in the piston shell with flow openings therethrough. Mounted on top of this orifice plate is a selector plate 98 which is rotatable to any number of positions to control the size of the openings and the flow through the piston for deflection of disks mounted beneath the orifice plate as described in the above referenced application Ser. No. 646,843. On compression, the fluid in the cylinder tube below the piston 24 will flow through an outer restricted passages to force the orifice selector plate upwardly deflecting an upper wave spring 101. Fluid flowing into the cylinder tube above the piston is squeezed through the outer restricted passages to damp rebound or compression stroke also as described in the referenced patent application Ser. No. 646,843.

The rotational movement of the selector plate is controlled by an actuator 102 fixed at a predetermined position entirely within the hollow piston rod 26. A hollow connector tube 101 extends from the actuator 102 within the piston rod 26 and is pinned or otherwise connected to the upstanding neck portion 103 of the piston assembly 24 extending therein as shown in FIG. 1. With such connection, high pressure damper fluid is present in the hollow piston rod and effective fluid sealing of the piston rod, preferably at the upper end thereof, is necessary. The actuator 102 has a rotatable output shaft 104 which extends through the connector tube 101 into driving connection with the rotatable selector plate 98 and is operative to rotate the selector plate to appropriate positions to control the rebound damping characteristics of the strut. The amount of selector plate rotation is a control function that can be manually selected by the operator or automatically selected by computer control in accordance with road conditions.

The upper end of the actuator 102 has a reduced diameter end portion 106 which has four female terminals 108 for conducting electrical energy into the actuator 102 for operation thereof. The terminals 108 receive the male terminals 110 of a cylindrical support socket 111 formed at the lower end of an elongated insulated bulkhead 114. Socket 111 has keyway 112 in the wall thereof which fits on key 113 on the upper end of the actuator 102 to mechanically interlock the actuator to the bulkhead 114.

Figure 3:
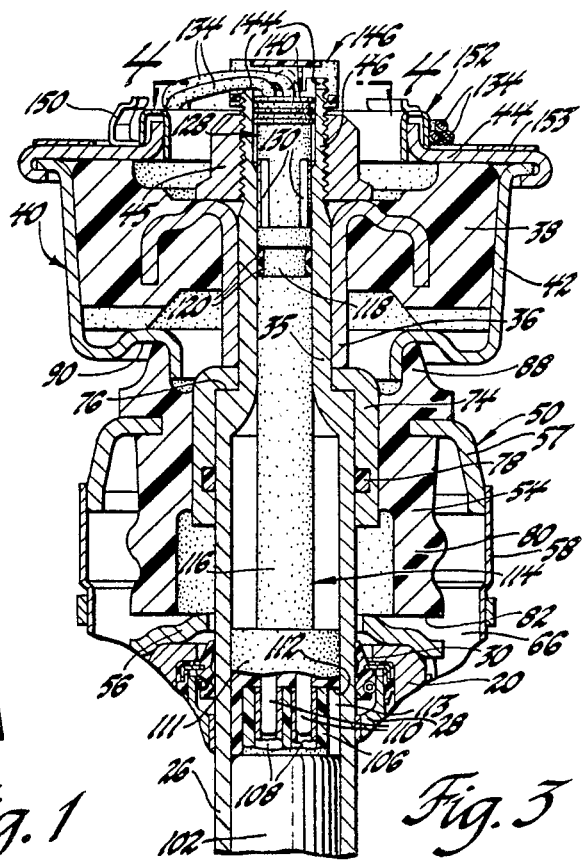
FIG. 3 is an enlarged view partially in cross-section of the upper portion of the suspension strut of FIG. 1
Figure 5:
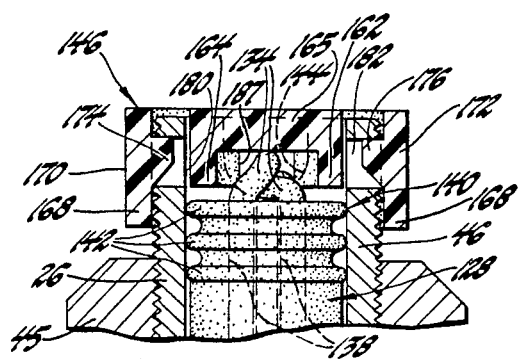
FIG. 5 is a cross-sectional view taken along lines 5—5 of FIG. 4 showing the dress cap assembly mounted to the piston rod of the strut.

The bulkhead 114 is preferably molded from glass polyester and is fully compatible with high temperature damper oils and pressures and other internal environmental forces of the strut. From the plug end, the bulkhead 114 has an elongated stem 116 of a reduced diameter to fit into the reduced diameter end 35 of the piston rod. The upper end of the stem 116 has an annular groove 118 which carries a pair of O-rings 120. These O-rings are sealingly engaged with the inner wall of the reduced diameter end 35 of the hollow piston rod to provide high pressure sealing of the damper oil. There are three male terminals 124 which buss to the four lower terminals 110. The upper terminals 124 project toward the upper end of the piston rod and fit into the female terminals 126 of a cylindrical socket 128 that slip fits into the upper end of the piston rod as shown in FIGS. 3 and 5. In addition to terminals 124, the upper end of the strut bulkhead has a pair of steel, upwardly-projecting locator pins 130 that fit into the longitudinally extending grooves 132 molded into the peripheral surface of the socket 128. These pins interlock and orient the socket 128 relative to the bulkhead and insure the electrical connection of these two parts as best illustrated in FIG. 3.

The female terminals 126 are electrically connected to the three electrical cables 134 that project upwardly therefrom through the top of socket 128 and then through cable sealing holes 138 in upper cylindrical seal 140. The seal 140 is molded from a self-lubricating silicone material and has a plurality of sealing ribs 142 which contact the inner diameter of the piston rod 26 to effectively block entry of any moisture or any contaminants to the socket 128 and the hollow piston rod.

Figure 2:
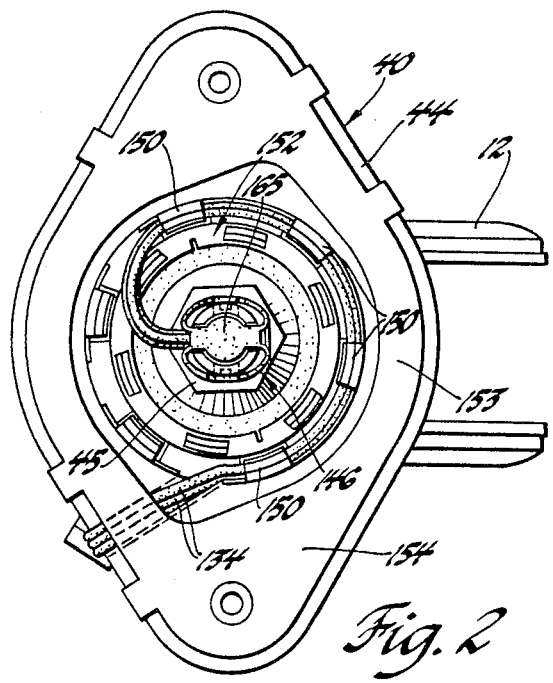
FIG. 2 is a top plan view of FIG. 1 taken along the lines 2—2 of FIG. 1.

After passing through the cable sealing holes, the cables are turned through one of the horizontally aligned U-shaped cuts 144 formed in the upper threaded end 46 of the piston rod 26. The cables are retained in this location by the installation of a wire dress cap 146 which locks on the threaded upper end of the piston rod as will be later described. From the dress cap, the cables are circled on top of the cover plate 44 and are retained in such position by arcuately arranged tabs 150 of a cable retainer 152. As shown in FIG. 2, the cables lead under a sheet metal outer plate 153 tabbed to cover plate 44 and extend downwardly along the dust tube 58 and under a retaining strap 156, fastened around the dust tube, to a terminal end plug 160. This plug 160 is operatively connected to a source of electrical energy and controls 161 such as the computer control system described in copending patent applications Ser. No. 681,312 filed Dec. 13, 1984 U.S. Pat. No. 4,589,676 entitled "Electronic Ride Control System" and Ser. No. 681,137 filed Dec. 13, 1984 U.S. Pat. No. 4,606,440 entitled "Variable Rate Damper For Electronic Ride Control" both assigned to the assignee of this invention.

In response to road signals received from the computer control system, the actuator 102 will be energized to rotate the output shaft 104 and thereby turn the selector plate of the valving within the shock absorber piston to select a damping rate which matches road conditions automatically.

The dress cap 146 is molded from nylon or other suitable material and has a pair of inner arcuate retainer walls 162, 164 which plug into and close the open threaded end 46 of the piston rod 26. The walls 162, 164 extend downwardly from the circular center of a topside bridge 165. The bridge has a pair of cable hold down bars 166, generally inverted U-shape in cross-section extending diametrically across the top off the cap to protect the cable. The cable is thus led radially from the circular center to fit into the U-shaped cuts 144 in the threaded top portion of the piston rod. The top of these bars 166 connect to an outer peripheral wall or skirt 168 which has identical locking tabs 170, 172 integrally formed therein diametrically opposed to one another and disposed at 90° with respect to the hold down bars 166. The locking tabs extend upwardly and are spring fingers that have inwardly extending locking projections 174, 176 formed on the upper ends thereof and releasably lock within the diametrically opposed openings or keepers 180, 182 in the piston rod. These openings are at right angles to the U-shaped cuts through which the hold down bars and the cables extend.

Figure 4:
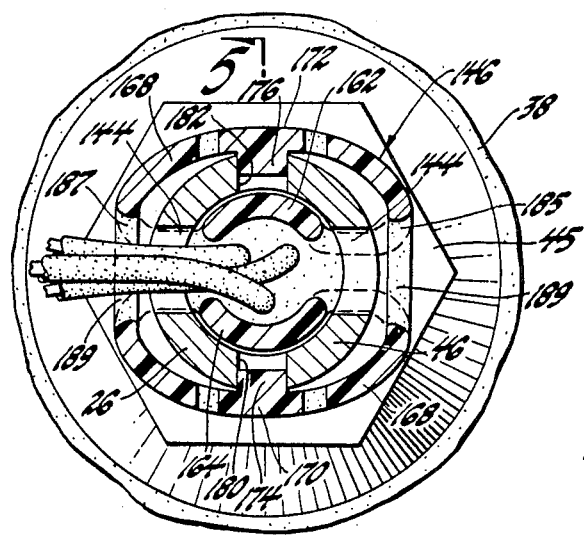
FIG. 4 is a cross-sectional view of an electrical wiring dress cap taken along lines 4—4 of FIG. 3.
Figure 6:
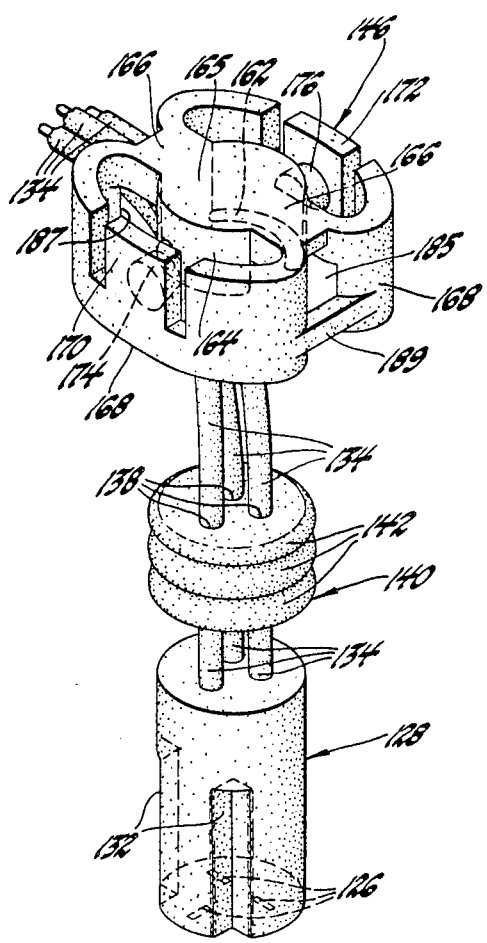
FIG. 6 is an exploded isometric view of the dress cap and the electrical connection to the actuator within the strut.
Figure 6:
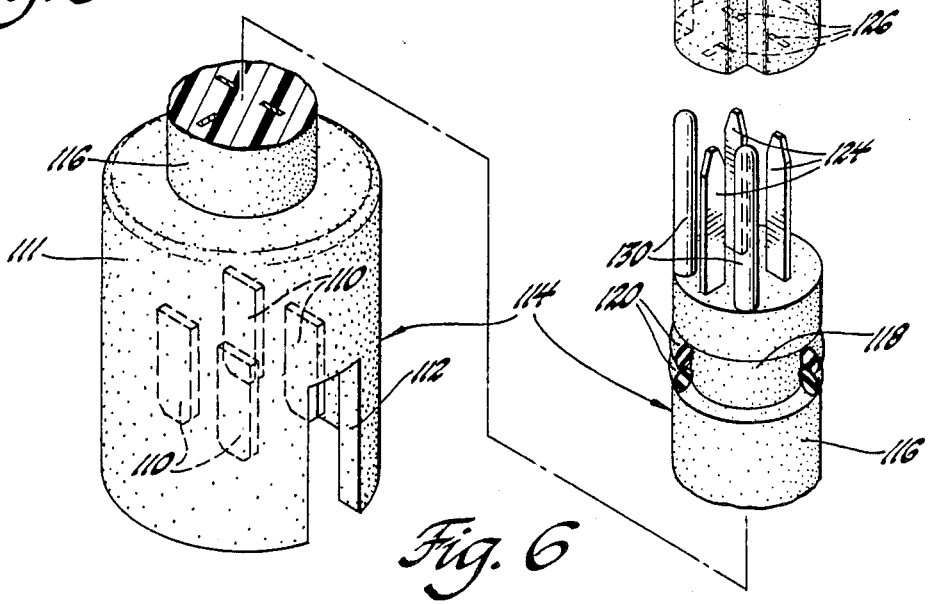

When the dress cap is pressed into the positive lock position, the seal 140 is forced downwardly so that the plug 128 is fully engaged with the terminals of the insulated bulkhead 128. If the plug is not properly connected or the seal 138 is not in a proper sealing position, the cap locking projections 174, 176 will not reach openings 180, 182 and the cap will self-reject. The installer can then effect proper reassembly of the plug and seal and lock the cap in place. Cables 134 pass through one of the opposing end openings 185, 187 provided by the lower bars 189 connecting bottom portions of the skirt 168 as shown in FIGS. 4 and 6. This secures the cap to the wiring harness comprised of plug 160, cables 134, cap 146, seal 138 and socket 128. With such wiring harness construction, the assembly is facilitated since all of the wiring parts and cap and seal are connected together and there are no loose pieces. This cap and other wiring harness components can be readily installed and removed without the use of tools. With the parts assembled and the wire dress cap in the positive locked position against axial and rotational movement, the strut is effectively sealed. The dress cap further protects and blocks entry of foreign material into strut routes the cables to the wire retainer as shown best in FIG. 2.

While a preferred embodiment of this invention has been shown and described, other embodiments will become more apparent to those skilled in the art. Accordingly, the scope of this invention is set forth in the following claims.

The embodiments of the invention in which an exclusive property or privilege is claimed are defined as follows:

1. A hydraulic damper for connection between sprung and unsprung portions of a wheeled vehicle and operative to dampen the ride motions of the vehicle comprising: an outer support tube operatively connected to one of said portions, a cylinder tube supported within said outer tubular member having a hydraulic fluid therein, a piston operatively mounted in said cylinder tube and having means movable to varying positions to selectively vary and control the flow of fluid therethrough when stroking within said cylinder tube to thereby control the damping characteristics of said damper, a hollow cylindrical piston rod operatively connected to said piston and extending upwardly through the end of said damper for connection with the other of said portions of said vehicle, electrically energizeable actuator means operative mounted within said hollow piston rod for varying said valve means, control means for operating said actuator means, cable means operatively connecting a source of electrical energy to said actuator means, the improvement comprising a cable dress cap adapted to be affixed to the top of said piston rod, said cable dress cap having a central top portion, a pair of arcuate retainer portions extending downwardly from said central portion for insertion into said piston rod, a pair of grooves formed in the walls of said piston rod at the top end thereof, a pair of cable hold down bars extending radially outwardly from said central portion for locking into said grooves for guiding said cables to said actuator, and a skirt carried by said the ends of said bars radially outwardly of said retainer portions and said piston rod, said skirt having a pair of locking tabs to snap lock into said piston rod to inhibit rotation of said dress cap relative to said rod and the axial removal of said dress cap from said rod.

2. The hydraulic damper of claim 1 and further comprising an upper cylindrical seal of resilient material deflectable to closely fit into the upper end of said piston rod immediately below said retainer portions of said cap, said cylindrical seal having a plurality of cable receiving holes therethrough through which said cable means extend, said cylindrical seal having sealing means on the periphery thereof for sealing engagement with the inner wall of said piston rod and said dress cap means being releasably fixed to said piston rod to position said seal and to close the end of said piston rod and guide said cable means outwardly from the upper end of said piston rod.

3. A hydraulic damper for connection between sprung and unsprung portions of a wheeled vehicle and operative to dampen the ride motions of the vehicle, a first tubular member having a hydraulic fluid therein operatively connected to one of said portions of said vehicle, a piston operatively mounted in said first tubular member and having means movable to selected positions therein to vary control the flow of fluid therethrough when stroking within said cylinder tube, a hollow piston rod having a cylindrical passage axially therein operatively connected to said piston and extending upwardly through the end of said damper for connection with the other of said portions of said vehicle, electrically energizeable actuator means operative mounted within said hollow piston rod for moving said means to said selected positions, control means for electrically energizing and controlling said actuator means, cable means electrically connecting said controls to said actuator means, the improvement comprising a dress cap adapted to be releasably locked to the open end of said hollow piston rod, said dress cap having a pair of inner arcuate retainer portions extending downwardly from a central portion thereof which fit within said open end of said rod, a cable guiding bar extend radially outwardly of said central portion through aligned openings in said piston rod to an outer skirt portion, said outer skirt having a pair of diametrically opposed locking tab means thereon which fit into keeper openings formed in said piston rod to positively lock said cap to the top of said piston rod.

* * * * *